(12) United States Patent
Ohashi

(10) Patent No.: US 11,342,760 B2
(45) Date of Patent: May 24, 2022

(54) ELECTRICAL DEVICE FOR PARALLEL CONNECTED BATTERIES

(71) Applicant: Sony Interactive Entertainment Inc., Tokyo (JP)

(72) Inventor: Tsuyoshi Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 179 days.

(21) Appl. No.: 16/479,001

(22) PCT Filed: Jan. 26, 2017

(86) PCT No.: PCT/JP2017/002803
§ 371 (c)(1),
(2) Date: Jul. 18, 2019

(87) PCT Pub. No.: WO2018/138843
PCT Pub. Date: Aug. 2, 2018

(65) Prior Publication Data
US 2019/0356134 A1    Nov. 21, 2019

(51) Int. Cl.
*H02J 7/00*    (2006.01)
(52) U.S. Cl.
CPC .......... *H02J 7/0003* (2013.01); *H02J 7/0013* (2013.01); *H02J 7/00714* (2020.01)
(58) Field of Classification Search
CPC .... H02J 7/0003; H02J 7/00714; H02J 7/0013; H02J 7/0071
USPC ....................................................... 320/126
See application file for complete search history.

(56) References Cited

U.S. PATENT DOCUMENTS

| | | | | |
|---|---|---|---|---|
| 5,640,079 A | * | 6/1997 | Nelson ................. | H02J 7/0071 320/153 |
| 5,680,031 A | * | 10/1997 | Pavlovic .............. | H02J 7/00711 320/145 |
| 5,825,155 A | * | 10/1998 | Ito ........................ | H02J 7/0063 320/118 |

(Continued)

FOREIGN PATENT DOCUMENTS

| | | |
|---|---|---|
| JP | 2002325375 A | 11/2002 |
| JP | 2008220104 A | 9/2008 |

(Continued)

OTHER PUBLICATIONS

USPTO STIC search report, by Heidi Myers, searched Mar. 18, 2021.*

(Continued)

*Primary Examiner* — John T Trischler
(74) *Attorney, Agent, or Firm* — Matthew B. Dernier, Esq.

(57) ABSTRACT

An electrical device having a plurality of parallel-connected built-in rechargeable batteries includes a power supply terminal and a charging circuit. The power supply terminal receives electrical power supplied from the outside of the electrical device. The charging circuit executes charge control so as to charge the plurality of rechargeable batteries using the electrical power supplied from the outside. During the execution of the charge control, the charging circuit interrupts charging of any one of the plurality of rechargeable batteries in accordance with a magnitude of a charging current flowing to each of the plurality of rechargeable batteries.

3 Claims, 5 Drawing Sheets

(56) References Cited

U.S. PATENT DOCUMENTS

| | | | | |
|---|---|---|---|---|
| 6,060,864 | A * | 5/2000 | Ito | G01R 19/16542 320/136 |
| 6,064,179 | A * | 5/2000 | Ito | H02J 7/0021 320/128 |
| 6,420,852 | B1 * | 7/2002 | Sato | H01M 10/46 320/134 |
| 6,850,039 | B2 * | 2/2005 | Popescu | H01M 10/441 320/134 |
| 7,394,225 | B2 * | 7/2008 | Guang | H02J 7/0018 320/158 |
| 7,463,008 | B2 * | 12/2008 | Takahashi | H02J 7/0022 320/118 |
| 7,528,574 | B1 * | 5/2009 | Adkins | H02J 7/0071 320/128 |
| 8,598,847 | B2 * | 12/2013 | Eberhard | H02J 7/0016 320/126 |
| 8,659,270 | B2 * | 2/2014 | Hermann | H02J 7/0031 320/164 |
| 8,704,405 | B2 * | 4/2014 | Deng | H01M 10/482 307/71 |
| 8,988,045 | B2 | 3/2015 | Klein | |
| 9,184,607 | B2 * | 11/2015 | Su | H01M 10/425 |
| 9,438,061 | B2 * | 9/2016 | Takeyama | H02J 7/0013 |
| 9,680,303 | B2 * | 6/2017 | Takahashi | H02J 3/383 |
| 9,966,774 | B2 * | 5/2018 | Wohltmann | H05B 45/00 |
| 10,164,448 | B2 * | 12/2018 | Tanaka | H01M 10/443 |
| 10,217,977 | B2 * | 2/2019 | Bhardwaj | H01M 10/052 |
| 10,291,039 | B2 * | 5/2019 | Cha | H02J 7/0018 |
| 10,377,245 | B2 * | 8/2019 | Kinoshita | B60L 50/10 |
| 10,396,570 | B2 * | 8/2019 | Loncarevic | H02J 7/0016 |
| 10,498,156 | B2 * | 12/2019 | Zhang | H02J 7/007 |
| 2004/0217737 | A1 * | 11/2004 | Popescu | H02J 7/0013 320/128 |
| 2004/0257043 | A1 * | 12/2004 | Takaoka | H02J 7/00716 320/132 |
| 2006/0284597 | A1 * | 12/2006 | Takahashi | H02J 7/0022 320/116 |
| 2007/0188134 | A1 * | 8/2007 | Hussain | H01M 10/44 320/114 |
| 2008/0169786 | A1 * | 7/2008 | Chang | H02J 7/0013 320/126 |
| 2011/0181233 | A1 * | 7/2011 | Mino | H02J 7/0045 320/101 |
| 2011/0204850 | A1 * | 8/2011 | Kaino | H02J 7/0071 320/116 |
| 2011/0234006 | A1 * | 9/2011 | Deng | H01M 10/441 307/71 |
| 2011/0291619 | A1 * | 12/2011 | Asakura | H01M 10/441 320/118 |
| 2012/0105015 | A1 * | 5/2012 | Hermann | H02J 7/0029 320/164 |
| 2012/0139491 | A1 * | 6/2012 | Eberhard | B60L 3/0046 320/118 |
| 2012/0212184 | A1 | 8/2012 | Klein | |
| 2013/0049702 | A1 * | 2/2013 | Dai | H02J 7/007 320/150 |
| 2013/0257382 | A1 * | 10/2013 | Field | H01M 10/44 320/134 |
| 2014/0117756 | A1 * | 5/2014 | Takahashi | H02J 7/35 307/23 |
| 2014/0159666 | A1 * | 6/2014 | Takeyama | H02J 7/00712 320/126 |
| 2014/0191720 | A1 * | 7/2014 | Sugiyama | B60L 58/21 320/109 |
| 2014/0253042 | A1 * | 9/2014 | Su | H01M 10/4207 320/134 |
| 2015/0102767 | A1 * | 4/2015 | Dai | G01R 31/392 320/107 |
| 2015/0130419 | A1 * | 5/2015 | Zhai | H02J 7/007 320/112 |
| 2015/0295433 | A1 * | 10/2015 | Honda | H02J 7/0013 320/124 |
| 2016/0064961 | A1 * | 3/2016 | DiCarlo | H02J 7/007 320/157 |
| 2017/0005497 | A1 * | 1/2017 | Sherstyuk | H01M 10/441 |
| 2018/0152043 | A1 * | 5/2018 | Geng | A01D 34/006 |
| 2018/0205234 | A1 * | 7/2018 | Zhang | H02J 7/00718 |
| 2018/0219398 | A1 * | 8/2018 | Schuetz | H02J 7/0013 |
| 2019/0123568 | A1 * | 4/2019 | Kaneko | H01M 10/482 |
| 2019/0356134 | A1 * | 11/2019 | Ohashi | H02J 7/0003 |
| 2019/0356157 | A1 * | 11/2019 | Ohashi | H01M 10/441 |
| 2020/0006957 | A1 * | 1/2020 | Ohashi | H02J 7/342 |
| 2020/0036198 | A1 * | 1/2020 | Kim | G06F 1/263 |
| 2020/0099236 | A1 * | 3/2020 | Ohashi | H02J 7/00 |
| 2020/0161875 | A1 * | 5/2020 | Nishikawa | H02J 7/0024 |

FOREIGN PATENT DOCUMENTS

| | | |
|---|---|---|
| JP | 2013509851 A | 3/2013 |
| JP | 2016111875 A | 6/2016 |

OTHER PUBLICATIONS

International Search Report for corresponding PCT Application No. PCT/2017/002803, 2 pages, dated Feb. 28, 2017.

Notice of Reasons for Refusal for corresponding JP Application No. JP2018564022, 9 pages, dated May 20, 2020.

International Preliminary Report on Patentability and Written Opinion for corresponding PCT Application No. PCT/2017/002803, 11 pages, dated Aug. 8, 2019.

\* cited by examiner

ELECTRICAL DEVICE FOR PARALLEL CONNECTED BATTERIES

TECHNICAL FIELD

The present invention relates to an electrical device that uses a plurality of different types of rechargeable batteries.

BACKGROUND ART

Some electrical devices using rechargeable batteries use a plurality of different types of rechargeable batteries. When using such electrical devices, it is necessary to charge each of the plurality of different types of rechargeable batteries.

SUMMARY

Technical Problem

In a case where a plurality of different types of rechargeable batteries are connected in parallel, a circulating current may flow from one rechargeable battery to another if the rechargeable batteries are not in equilibrium. Such a circulating current is undesirable because it may result in the flow of a current larger than the maximum charging current or maximum discharging current tolerated by each rechargeable battery. Therefore, when a plurality of different types of rechargeable batteries are to be charged simultaneously, it is important that they be charged while they remain in a state of equilibrium wherever possible.

The present invention has been made in view of the above circumstances. An object of the present invention is to provide an electrical device that is capable of charging a plurality of different types of rechargeable batteries while they are approaching the equilibrium state.

Solution to Problem

An electrical device according to the present invention has a plurality of parallel-connected built-in rechargeable batteries, and includes a power supply terminal that receives electrical power supplied from an outside of the electrical device; and a charging circuit that executes charge control so as to charge the plurality of rechargeable batteries using the electrical power supplied from the outside. During the execution of the charge control, the charging circuit interrupts charging of a particular one of the rechargeable batteries in accordance with the magnitude of a charging current flowing to each of the rechargeable batteries.

DESCRIPTION OF EMBODIMENTS

Embodiments of the present invention will now be described in detail with reference to the accompanying drawings.

Figure 1:
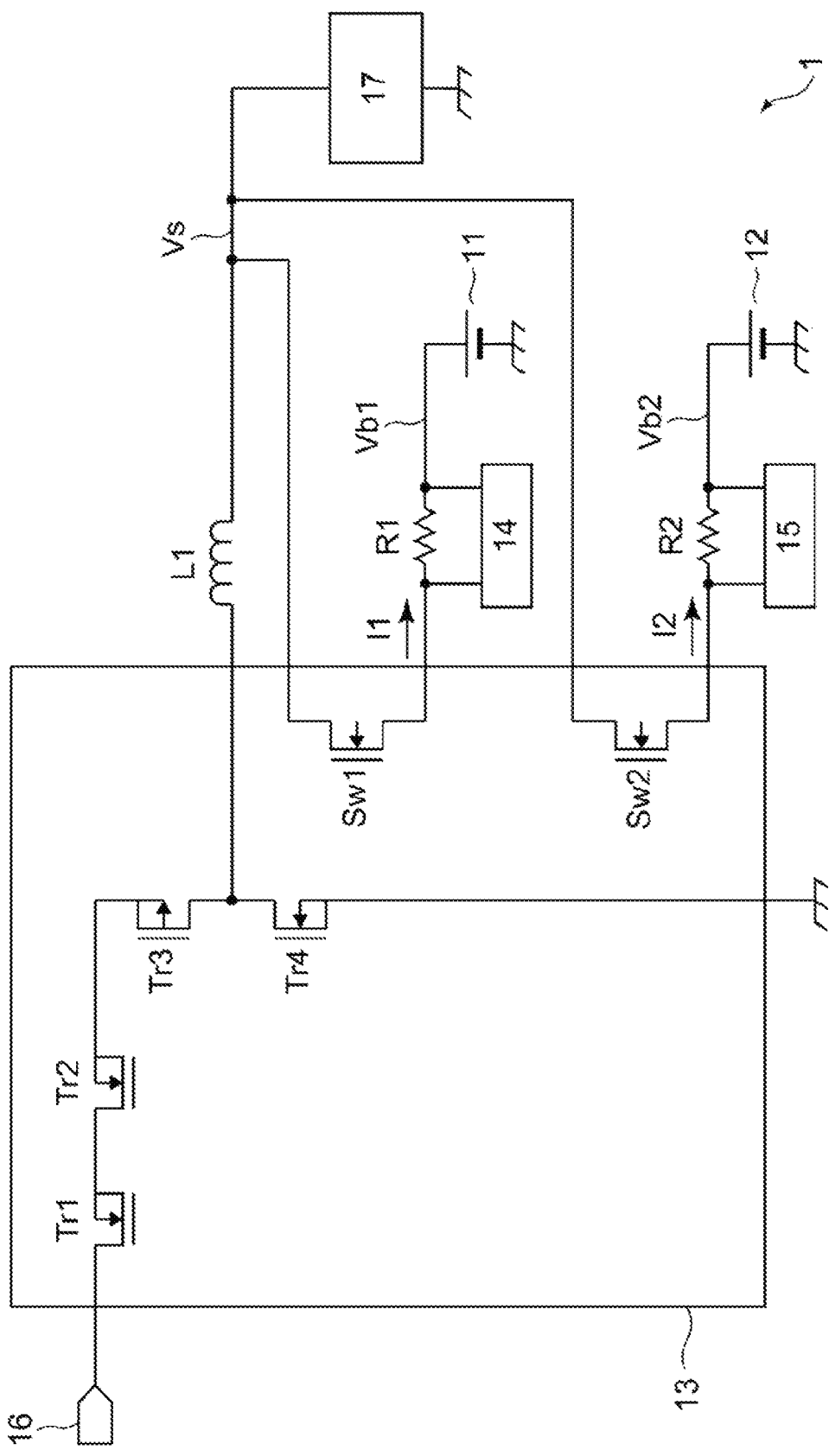
FIG. 1 is a diagram illustrating a circuit configuration of an electrical device according to an embodiment of the present invention.

FIG. 1 is a diagram illustrating a schematic circuit configuration of an electrical device 1 according to an embodiment of the present invention. As illustrated in FIG. 1, the electrical device 1 is capable of incorporating a first rechargeable battery 11 and a second rechargeable battery 12, and includes a charging circuit 13, a first capacity computation circuit 14, a second capacity computation circuit 15, a power supply terminal 16, and a load 17. The electrical device 1 according to the present embodiment may be, for example, an electric tool, an electric vehicle, a storage battery, an airplane, a cellular phone or other mobile device, a head-mounted display, or any other device operating on electrical power supplied from a rechargeable battery.

The first rechargeable battery 11 and the second rechargeable battery 12 are lithium-ion batteries, all solid-state batteries, or other secondary batteries capable of being repeatedly recharged and discharged. The electrical device 1 operates on electrical power supplied from these rechargeable batteries or an external power source (described later). As illustrated in FIG. 1, the two rechargeable batteries are connected in parallel.

The charging circuit 13 is a circuit for charging the first rechargeable battery 11 and the second rechargeable battery 12, and may be a charging integrated circuit (IC) or other similar integrated circuit. The charging circuit 13 includes a switching element Sw1 and a switching element Sw2. The switching element Sw1 is connected to the first rechargeable battery 11. The switching element Sw2 is connected to the second rechargeable battery 12. The charging circuit 13 further includes a plurality of built-in transistors Tr1 to Tr4 that are used to control a charging current and a charging voltage. The input side of the charging circuit 13 is connected to the power supply terminal 16, and the output side is connected to the load 17 through a coil L1. One end of each of the switching elements Sw1 and Sw2 is connected to the other end of the coil L1. The other end of the switching element Sw1 is connected to the positive electrode of the first rechargeable battery 11 through a resistor R1. The other end of the switching element Sw2 is connected to the positive electrode of the second rechargeable battery 12 through a resistor R2.

The charging circuit 13 receives electrical power supplied from an external power source through the power supply terminal 16, converts the received electrical power to a predetermined voltage, and supplies the predetermined voltage to the first and second rechargeable batteries 11 and 12 in order to charge them. An output voltage outputted from the charging circuit 13 is hereinafter designated as Vs. Charge control executed by the charging circuit 13 will be described in detail later.

The first capacity computation circuit 14 and the second capacity computation circuit 15 respectively compute the battery capacity of the associated rechargeable battery. Specifically, the first capacity computation circuit 14 is connected in parallel to the resistor R1 in order to measure a charging current I1 flowing to the first rechargeable battery 11 and the battery voltage Vb1 of the first rechargeable battery 11. The first capacity computation circuit 14 then uses the measured information to compute the battery capacity of the first rechargeable battery 11 at the time point of measurement. Similarly, the second capacity computation circuit 15 is connected in parallel to the resistor R2 in order to measure a charging current I2 flowing to the second rechargeable battery 12 and the battery voltage Vb2 of the second rechargeable battery 12. Based on the result of measurement, the second capacity computation circuit 15 computes the battery capacity of the second rechargeable battery 12.

The power supply terminal 16 is connected to the external power source (hereinafter referred to as the external power supply). Electrical power for charging the first and second rechargeable batteries 11 and 12 is supplied from the external power supply through the power supply terminal 16. The power supply terminal 16 may be connected, for example, to an alternating current (AC) adapter that receives electrical power supplied from a commercial alternating-current power source, converts the received electrical power to a direct current, and outputs the direct current, or to a universal serial bus (USB) host device or other electrical device compatible with the supplied electrical power.

The load 17 is, for example, a circuit element for implementing intrinsic functions of the electrical device 1. The load 17 operates by consuming electrical power supplied from the external power supply and the first and second rechargeable batteries 11 and 12. The load 17 may include a motor, an integrated circuit, and various other parts appropriate for the type of electrical device 1. In a case where the electrical device 1 is, for example, a storage battery, the load operating by consuming electrical power supplied from each rechargeable battery may be disposed outside the electrical device 1. The voltage Vs outputted from the charging circuit 13 is inputted to the load 17.

Figure 2:
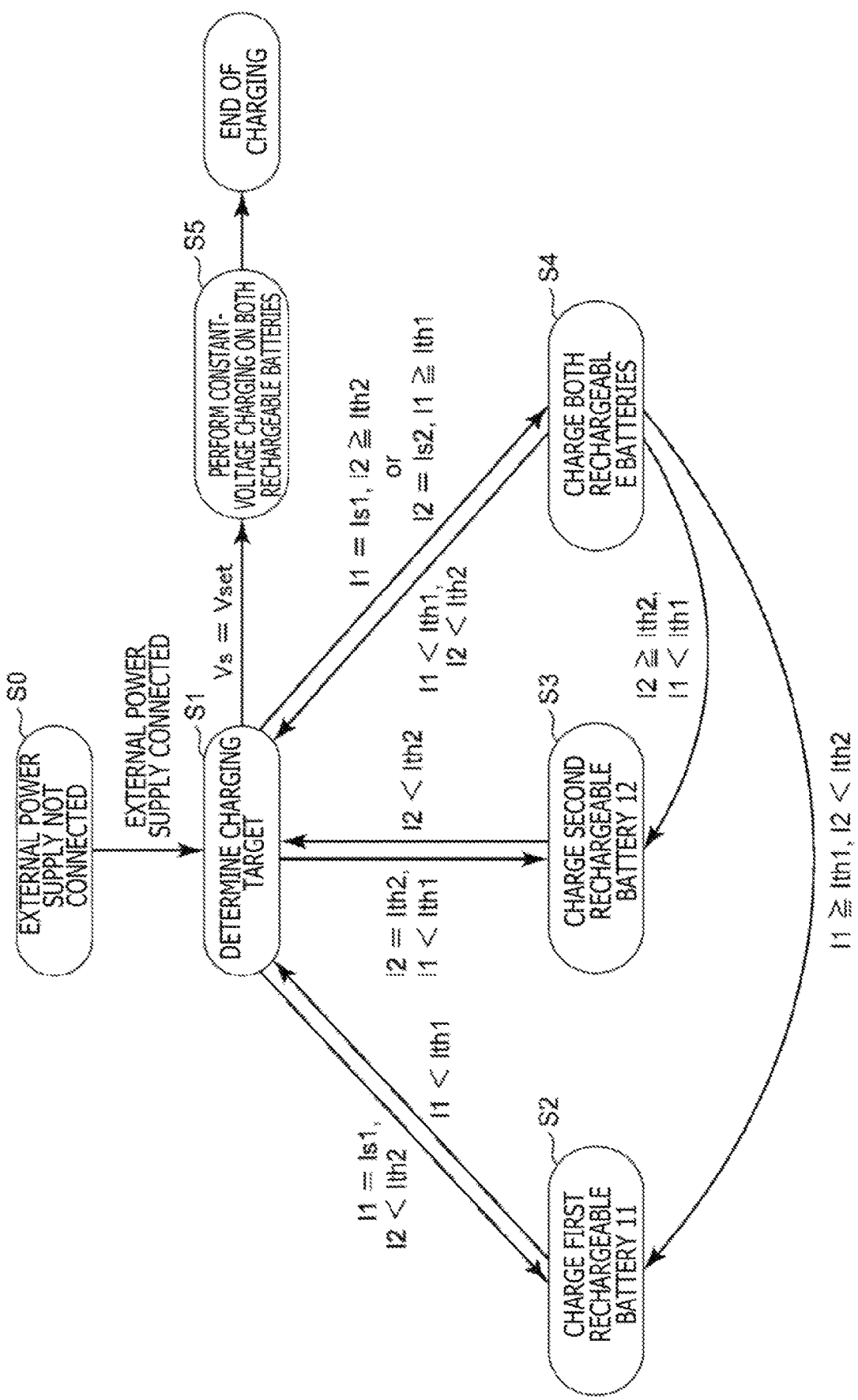
FIG. 2 is a diagram illustrating state transitions during charge control according to a first example.

A state transition diagram in FIG. 2 will now be used to describe a first example of charge control that is executed by the charging circuit 13 in a case where the external power supply is connected to the power supply terminal 16. The maximum charging current of the first rechargeable battery 11 is hereinafter designated as Is1, and the maximum charging current of the second rechargeable battery 12 is hereinafter designated as Is2. Here, the maximum charging current (maximum charging rate) is a magnitude of the maximum current that is allowed to flow to the rechargeable batteries during charging. A current value indicative of the maximum charging current is determined so that the rechargeable batteries are deteriorated by a continuous flow of a charging current greater than the current value. The values Is1 and Is2 may differ from each other. Each of the maximum charging currents Is1 and Is2 may be a rated value for the associated rechargeable battery or may be set to a value smaller than the rated value. When the maximum charging currents Is1 and Is2 are set to relatively small values, the deterioration of rechargeable batteries can be suppressed to a greater extent.

The threshold values for currents for determining whether or not to interrupt the charging of the rechargeable batteries will be hereinafter designated as Ith1 and Ith2, respectively. The threshold value Ith1 for the first rechargeable battery 11 is smaller than the value Is1, and the threshold value Ith2 for the second rechargeable battery 12 is smaller than the value Is2. The values Ith1 and Ith2 may differ from each other.

In a state (state S0) where the external power supply is not connected to the power supply terminal 16, the electrical device 1 is monitoring the connection of the external power supply to the power supply terminal 16. When the connection of the external power supply to the power supply terminal 16 is detected, the charging circuit 13 transitions to a state (state S1) where control is executed to determine the rechargeable battery to be charged. More specifically, the charging circuit 13 allows a current to flow to both of the two rechargeable batteries by turning on the switching elements Sw1 and Sw2. The charging circuit 13 then gradually increases the output voltage Vs from an initial value. The initial value of the output voltage Vs in a case where the external power supply is connected may be the currently prevailing maximum battery voltage value of all rechargeable batteries (the battery voltage Vb1 or Vb2 whichever higher in the present example). Increasing the output voltage Vs increases the charging currents I1 and I2. The charging circuit 13 monitors the charging currents I1 and I2. Based on the values of the charging currents I1 and I2, the charging circuit 13 determines the next state to which it should transition (i.e., determines the rechargeable battery to be charged).

When, in the state S1, either the charging current I1 or the charging current I2 reaches the maximum charging current, the charging circuit 13 fixes the output voltage Vs and transitions to the next state. In this instance, the target state to transition to is determined depending on which rechargeable battery has reached the maximum charging current and depending on whether the charging current of a rechargeable battery still lower than the maximum charging current is smaller than a threshold value. More specifically, the charging circuit 13 selects, as a charging target, a rechargeable battery whose charging current has reached the maximum charging current. Furthermore, a rechargeable battery that has not reached the maximum charging current is selected as a charging target when the charging current is equal to or greater than the threshold value, and is not selected as a charging target when the charging current is smaller than the threshold value.

Detailed determination criteria are described below. In a case where the maximum charging current Is1 is reached earlier by the charging current I1 and the charging current I2 is smaller than the threshold value Ith2, the charging circuit 13 transitions to a state (state S2) where only the first rechargeable battery 11 is to be charged. Conversely, in a case where the maximum charging current Is2 is reached earlier by the charging current I2 and the charging current I1 is smaller than the threshold value Ith1, the charging circuit 13 transitions to a state (state S3) where only the second rechargeable battery 12 is to be charged. In a case where the maximum charging current Is1 is reached by the charging current I1 and the charging current I2 is equal to or greater than the threshold value Ith2, the charging circuit 13 transitions to a state (state S4) where both rechargeable batteries are to be charged. In a case where the maximum charging current Is2 is reached by the charging current I2 and the charging current I1 is equal to or greater than the threshold value Ith1, the charging circuit 13 also transitions to the state S4. In a case where the maximum charging currents are simultaneously reached by the charging currents, the charging circuit 13 also transitions to the state S4.

Upon transitioning to the state S2, the charging circuit 13 interrupts the charging of the second rechargeable battery 12 by turning off the switching element Sw2. The charging circuit 13 then charges the first rechargeable battery 11 while maintaining the output voltage Vs present at the time point of transitioning to the state S2. In this state, as the first rechargeable battery 11 is charged, the battery voltage Vb1 increases and the charging current I1 decreases. As a result, when the charging current I1 is smaller than the threshold value Ith1, the charging circuit 13 returns to the state S1 and newly selects a rechargeable battery to be charged.

Similarly, upon transitioning to the state S3, the charging circuit 13 interrupts the charging of the first rechargeable battery 11 by turning off the switching element Sw1. The charging circuit 13 then charges the second rechargeable battery 12 while maintaining the output voltage Vs present at the time point of transitioning to the state S3. When the charging current I2 is smaller than the threshold value Ith2, the charging circuit 13 returns to the state S1 and newly selects a rechargeable battery to be charged.

Upon transitioning to the state S4, the charging circuit 13 keeps the switching elements Sw1 and Sw2 on, and charges both the first and second rechargeable batteries 11 and 12 while maintaining the output voltage Vs present at the time point of transitioning to the state S4. In this state, as the battery voltages of the rechargeable batteries increase, the charging currents I1 and I2 both decrease. As a result, when either of the charging currents is smaller than the threshold value, the charging circuit 13 transitions to a state where the charging of a rechargeable battery associated with that charging current is to be interrupted. More specifically, when the charging current I2 becomes smaller than the threshold value Ith2 during charging in the state S4, the charging circuit 13 transitions to the state S2 and interrupts the charging of the second rechargeable battery 12. Conversely, when the charging current I1 becomes smaller than the threshold value Ith1 in the state S4, the charging circuit 13 transitions to the state S3 and interrupts the charging of the first rechargeable battery 11. If the charging currents simultaneously become smaller than their respective threshold values, the charging circuit 13 transitions to the state S1 and newly selects a charging target.

Upon re-transitioning to the state S1 from the state S2, S3, or S4, the charging circuit 13 turns on the switching elements Sw1 and Sw2 and increases the output voltage Vs from its level prevailing at the time point of transitioning until either one of the charging current I1 or I2 reaches the maximum charging current. Then, as is the case when the external power supply is initially connected, the charging circuit 13 selects the next charging target depending on which charging current has reached the maximum charging current earlier and depending on whether a charging current other than the charging current that has reached the maximum charging current is equal to or greater than the threshold value. If the output voltage Vs reaches a full-charge voltage Vset as a result of the increase in the output voltage Vs, the charging circuit 13 transitions to a state S5. The full-charge voltage Vset is a voltage value that is preset as a voltage for constant-voltage charging.

The state S5 is a state where both rechargeable batteries are to be charged by a common constant-voltage charging method. In this state, the charging circuit 13 charges both the first and second rechargeable batteries 11 and 12 while maintaining the full-charge voltage Vset. When a rechargeable battery satisfies predetermined termination conditions in this state, the charging circuit 13 terminates the charging of that rechargeable battery. More specifically, upon detecting that the charging current I1 is decreased to a predetermined value (e.g., a value equivalent to 0.1 C), the charging circuit 13 concludes that the first rechargeable battery 11 is fully charged, and terminates the charging of the first rechargeable battery 11 by turning off the switching element Sw1. Similarly, when the charging current I2 is decreased to a predetermined value, the charging circuit 13 terminates the charging of the second rechargeable battery 12 by turning off the switching element Sw2. In this manner, charging is performed until the first and second rechargeable batteries 11 and 12 are both fully charged.

As described above, the state transitions between the states S1, S2, S3, and S4 are all made based on the result that is obtained by comparing the charging currents I1 and I2 with the maximum charging currents or the threshold values. In any one of the states S1, S2, S3, and S4, as far as a charging target is selected by making the above-described state transitions, charging is performed at any time point while the charging current of each rechargeable battery is equal to or greater than the threshold value and equal to or smaller than the maximum charging current. Consequently, the charging circuit 13 is able to perform charging efficiently without exceeding the maximum charging current of each rechargeable battery.

When a determination is to be made in relation to a state transition by comparing the charging currents with the maximum charging currents or the threshold values, it is necessary to provide a stabilization period in consideration of electrical current variations caused, for instance, by the interruption or resumption of charging. More specifically, it is preferable that, for example, the charging circuit 13 ignore a measurement result obtained immediately after the interruption or resumption of charging and make comparisons using an average value obtained by averaging a plurality of sampling results. An alternative is to make a state transition when a current value measurement result prompting for a state transition is repeatedly obtained for a predetermined period of time.

Figure 3:
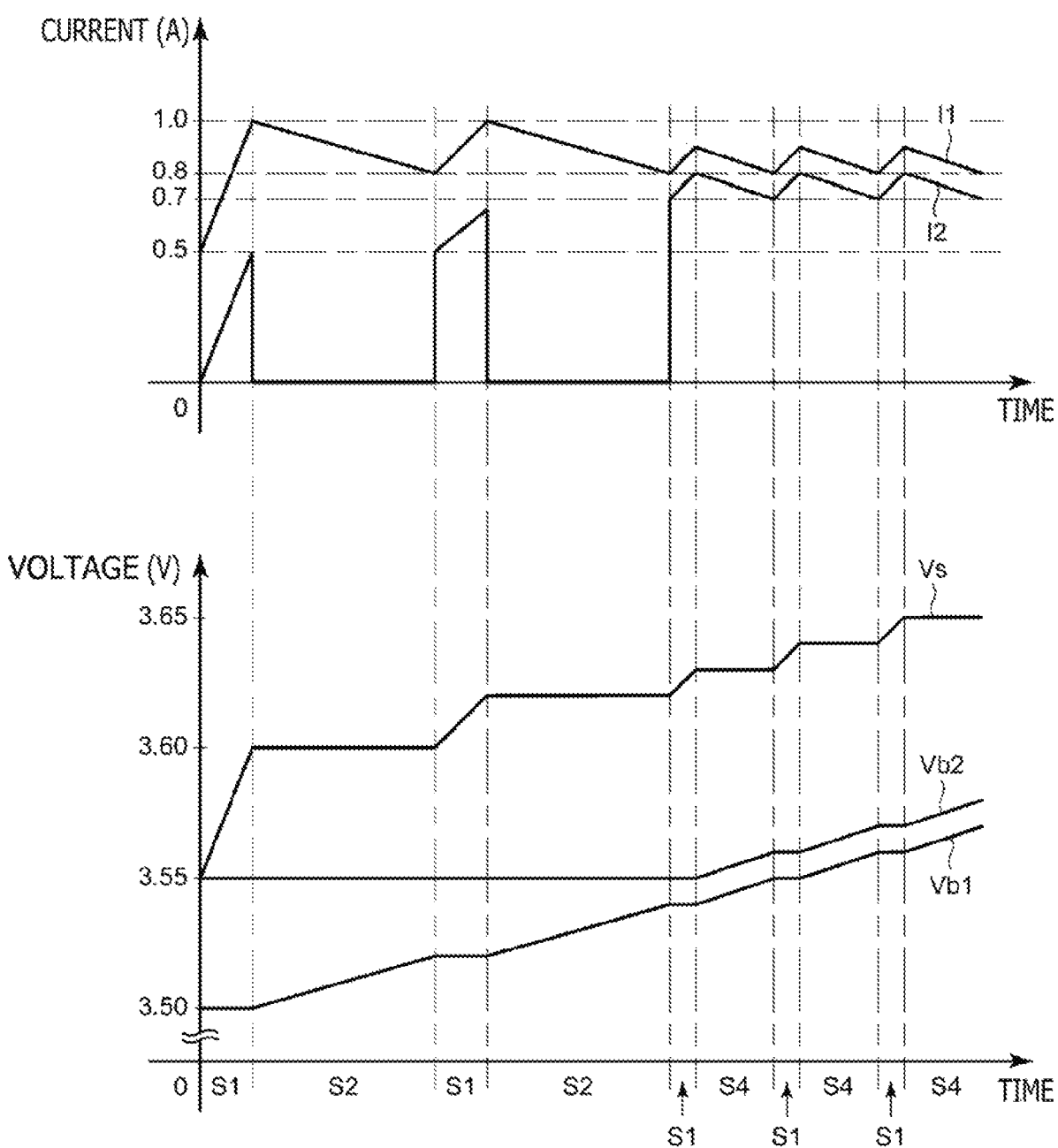
FIG. 3 is a diagram illustrating temporal changes in the output voltage of a charging circuit and the battery voltage and charging current of each rechargeable battery during charge control according to the first example.

Exemplary temporal changes in the output voltage Vs of the charging circuit 13 and in the battery voltage and charging current of each rechargeable battery in the above-described first example of charge control will now be described with reference to FIG. 3. Graphs in FIG. 3 schematically illustrate temporal changes in voltages and currents. The example of FIG. 3 assumes that the maximum charging currents of the rechargeable batteries are expressed by the equations I1=1.0 A and I2=0.8 A, and that the threshold values are expressed by the equations Ith1=0.8 A and Ith2=0.7 A. It is also assumed that the battery voltages of the rechargeable batteries at the time point of external power supply connection are expressed by the equations Vb1=3.50 V and Vb2=3.55 V. Further, it is assumed that the resistance value between the output voltage Vs and the battery voltage Vb1 (the sum of the internal resistance value of the first rechargeable battery 11, the resistance value of the switching element Sw1, and the resistance value of the resistor R1) is 0.1Ω. Similarly, it is assumed that the resistance value between the output voltage Vs and the battery voltage Vb2 (the sum of the internal resistance value of the second rechargeable battery 12, the resistance value of the switching element Sw2, and the resistance value of the resistor R2) is also 0.1Ω. The state S1 depicted in FIG. 3 is exaggerated although it is actually short in duration. Further, the increases in the battery voltages Vb1 and Vb2 during the state S1 are omitted from FIG. 3.

When the external power supply is connected, the charging circuit 13 first increases the output voltage Vs using an initial value of 3.55 V, which is the maximum value of the battery voltage. In the example of FIG. 3, the charging current I1 reaches the maximum charging current 1.0 A at a time point when the output voltage Vs reaches 3.60 V. At this time point, however, the charging current I2 is smaller than a threshold value of 0.7 A. At this time point, the charging circuit 13 transitions to the state S2 and interrupts the charging of the second rechargeable battery 12. This reduces the charging current I2 to 0 (zero). Subsequently, the first rechargeable battery 11 is charged, and the charging current I1 decreases with an increase in the battery voltage Vb1. When the charging current I1 decreases to a threshold value of 0.8 A, the charging circuit 13 transitions to the state S1 and increases the output voltage Vs. In this instance, too, the charging current I1 reaches the maximum charging current Is1 earlier, and a transition to the state S2 occurs again. When the above-described control is executed repeatedly, the first rechargeable battery 11 is charged to increase its battery voltage Vb1.

In the third state S1 depicted in the graphs of FIG. 3, the charging current I2 reaches a maximum charging current of 0.8 A earlier while the charging current I1 at that time point is not smaller than a threshold value of 0.8 A. Therefore, the charging circuit 13 transitions to the state S4 and simultaneously charges both rechargeable batteries. Subsequently, the charging circuit 13 alternates between the state S1 and the state S4, and charges both rechargeable batteries while increasing the output voltage Vs. In this state, the difference between the battery voltage Vb1 and the battery voltage Vb2 is reduced to approximately 0.01 V so that the two rechargeable batteries are charged while they are substantially maintained in a state of equilibrium. Subsequently, although not depicted in FIG. 3, the above-described charge control is continuously executed until the output voltage Vs reaches the full-charge voltage Vset.

Figure 4:
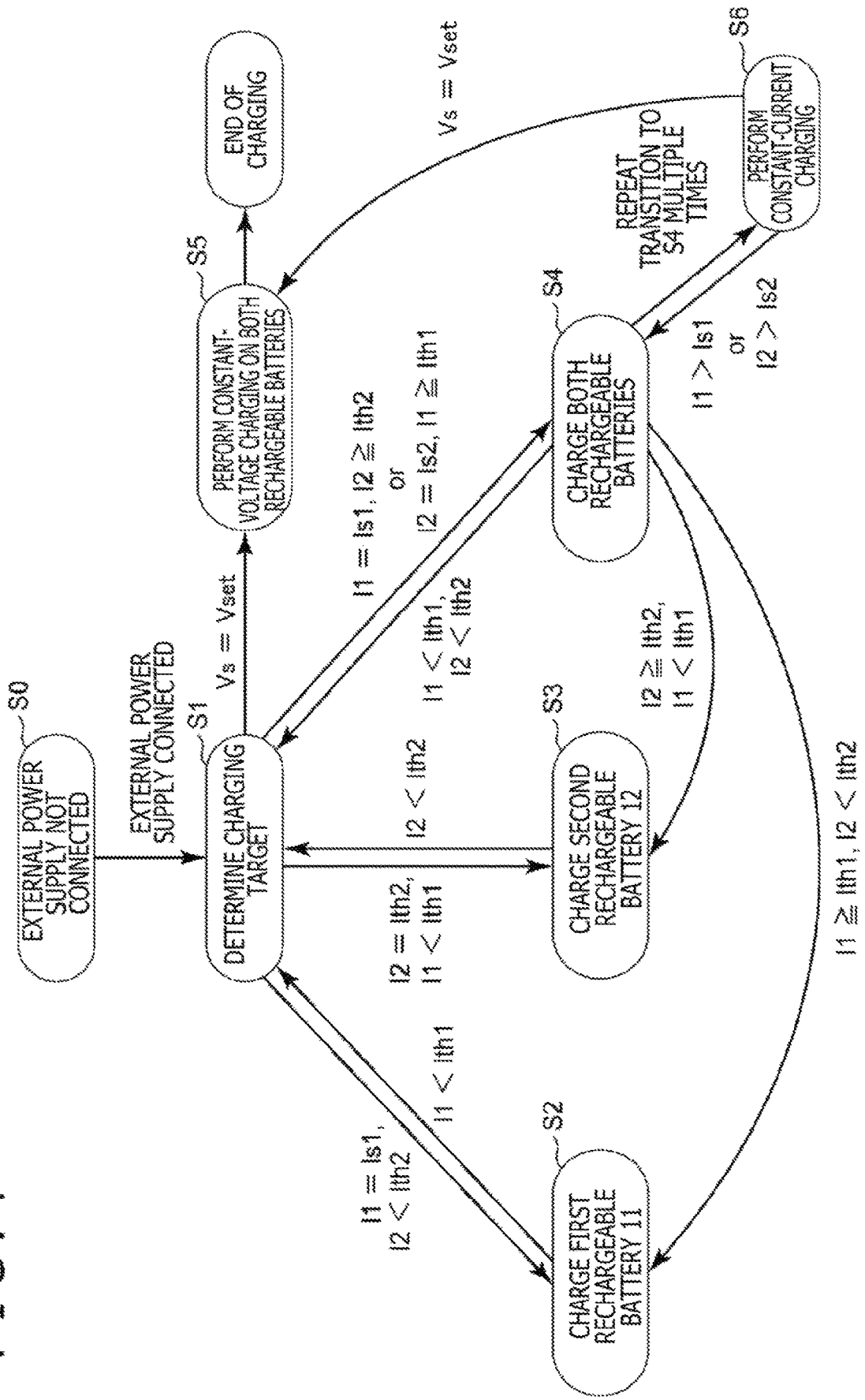
FIG. 4 is a diagram illustrating state transitions during charge control according to a second example.

A second example of charge control executed by the charging circuit 13 will now be described with reference to a state transition diagram in FIG. 4. Control executed in the second example is similar to the control executed in the first example except that a transition to a state S6 occurs when predetermined conditions are satisfied. Therefore, differences from the first example will be mainly described by omitting the explanation of operations similar to those in the first example.

In the second example, a transition to the state S6 occurs when a transition from the state S1 to the state S4 is repeated multiple times. More specifically, the transition to the state S6 occurs when the transition to the state S4 is made N times since the start of charging. N is a predetermined number of times. As mentioned earlier, the repeated transition to the state S4 signifies that the difference between the battery voltage Vb1 and the battery voltage Vb2 is reduced.

When the transition to the state S6 occurs, the charging circuit 13 performs constant-current charging. The reference current used for the constant-current charging is either the maximum charging current Is1 or the maximum charging current Is2, whichever is smaller. If, for example, Is1>Is2, the charging circuit 13 charges both the first and second rechargeable batteries 11 and 12 while controlling the output voltage Vs in such a manner that the charging current I2 flowing to the second rechargeable battery 12 is equal to the maximum charging current Is2. That is, in contrast to the states S2 to S4, the output voltage Vs does not remain constant in the state S6. In this state, the remaining charging current (I1 in the present example), which is not targeted for constant-current control, is maintained equal to or greater than the threshold value and equal to or smaller than the maximum charging current. When the output voltage Vs reaches the full-charge voltage Vset in this state, as is the case with the first example, the charging circuit 13 transitions to the state S5.

To ensure safety, the charging circuit 13 conducts monitoring to prevent the charging currents I1 and I2 from exceeding their respective maximum charging currents while constant-current charging is being performed in the state S6. If the charging current I1 exceeds the maximum charging current Is1 or if the charging current I2 exceeds the maximum charging current Is2, the charging circuit 13 transitions to the state S4, and performs charging again while maintaining the output voltage Vs. Further, although not depicted in FIG. 4, if, in the state S6, for example, the external power supply is reconnected or either one of the rechargeable batteries is connected or disconnected, a transition to the state S1 occurs.

Figure 5:
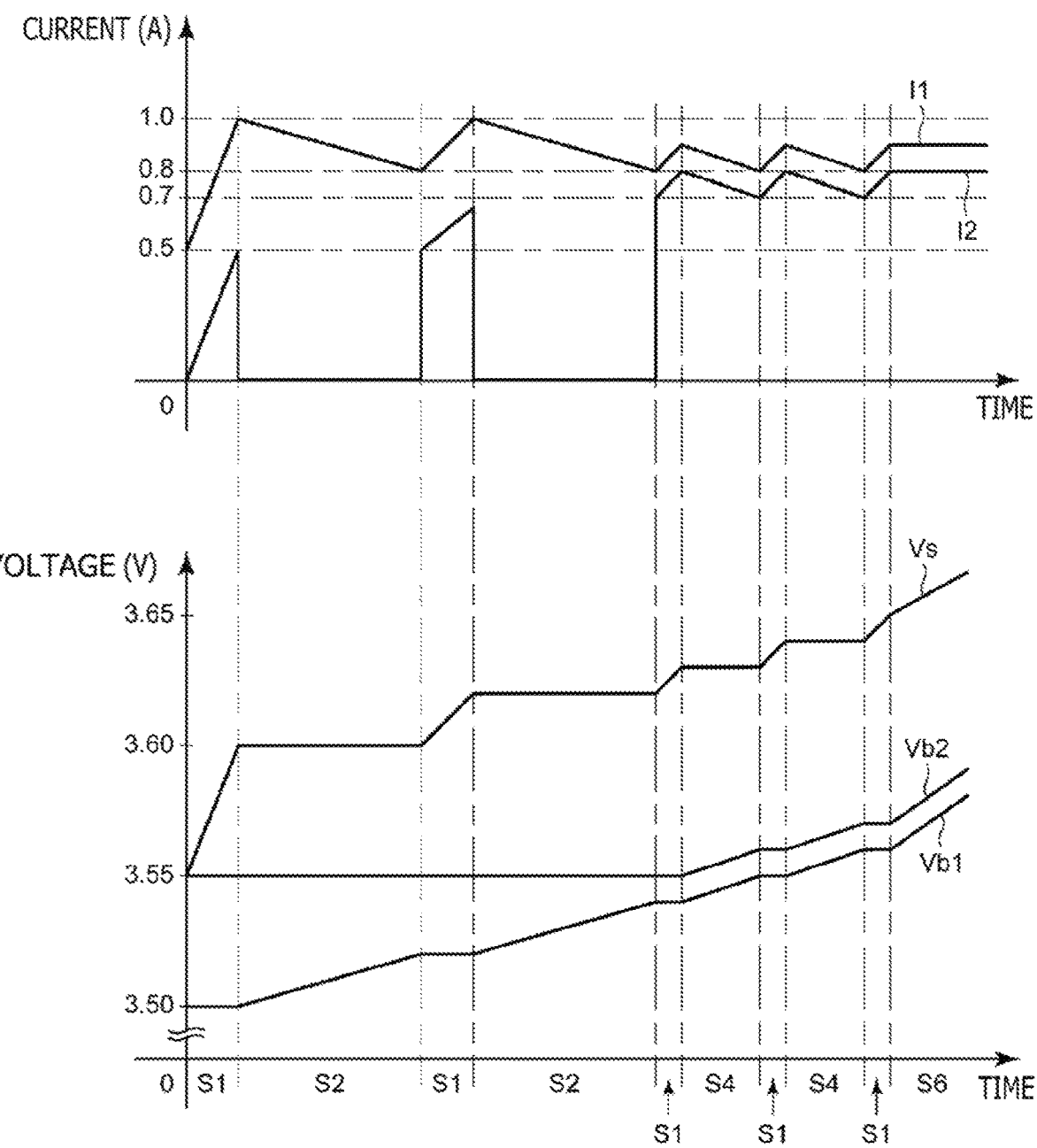
FIG. 5 is a diagram illustrating temporal changes in the output voltage of the charging circuit and the battery voltage and charging current of each rechargeable battery during charge control according to the second example.

Graphs in FIG. 5 schematically illustrate, under the same conditions as in FIG. 3, exemplary temporal changes in the output voltage Vs of the charging circuit 13 and in the battery voltage and charging current of each rechargeable battery in the second example of charge control. The example of FIG. 5 assumes that a transition to the state S6 occurs at a time point when the third transition is made from the state S1 to the state S4. As indicated by the graphs, the charging currents I1 and I2 remain constant in the state S6. Meanwhile, the output voltage Vs increases so that the battery voltages Vb1 and Vb2 increase at a higher rate than in the state S4. That is, the first and second rechargeable batteries 11 and 12 are charged at a higher rate than in the state S4. As described above, when constant-current charging is performed in the state S6, the above-described second example of charge control is able to reduce the overall charging time as compared to the first example.

Control of a recharge threshold value will now be described. In some cases, the recharge threshold value is set in the charging circuit 13. The recharge threshold value determines the necessity of recharging when the battery voltage is lowered by discharging. In such cases, the charging circuit 13 has a function of performing recharging when it is determined that the charging of a rechargeable battery is not being performed and that the battery voltage is not higher than the recharge threshold value. However, in the states S2 and S3, the present embodiment intentionally interrupts the charging of a rechargeable battery that is still not fully charged. If a recharge function is enabled, the charging circuit 13 may determine, in a state where charging is interrupted, that recharging should be performed.

The above problem may be avoided by allowing the present embodiment to disable the recharge function while charge control is being executed. However, if the recharge function is disabled, it is probable that charging will not be performed after the recharge function cannot normally be re-enabled due, for instance, to apparatus malfunction. In view of such circumstances, when transitioning to the state S2 or S3, the charging circuit 13 may change the recharge threshold value to a value lower than the currently prevailing battery voltage. The charging circuit 13 may set different recharge threshold values for the rechargeable batteries or set a common recharge threshold value for them.

When the recharge threshold value is updated as described above, it is possible to keep the recharge function enabled and prevent an interrupted charging operation from being resumed. When such control is to be executed, the charging circuit 13 needs to return the recharge threshold value to its previous value at a predetermined time point. More specifically, when transitioning to the state S1, the charging circuit 13 returns the recharge threshold value to its previous value at a time point when, for instance, a rechargeable battery is fully charged or the external power supply is detected to be disconnected or reconnected. This permits the recharge function to be compatible with the charge control executed by the present embodiment.

As described above, based on the magnitude of each charging current in a situation where a plurality of rechargeable batteries are to be simultaneously charged, the electrical device 1 according to the present embodiment selects a rechargeable battery to be charged preferentially and, in some cases, transitions to a state for charging a particular rechargeable battery and interrupting the charging of another rechargeable battery. This makes it possible to perform charging efficiently and allow the rechargeable batteries to quickly approach a state of equilibrium while preventing the charging current of each rechargeable battery from exceeding the maximum charging current.

The present invention is not limited to the above-described embodiment. For example, the foregoing description assumes that a switching element for turning a charge function on and off is disposed on the positive electrode of each rechargeable battery. However, the switching element may alternatively be disposed on the negative electrode of a rechargeable battery. Further, the electrical device 1 is not limited to the circuit configuration illustrated in FIG. 1. The electrical device 1 may alternatively have various other circuit configurations for performing the same functions.

Moreover, the foregoing description assumes that only two rechargeable batteries are to be subjected to charge control. Alternatively, however, three or more rechargeable batteries may be subjected to similar charge control. In such an instance, too, based on the magnitude of each charging current in a situation where a plurality of rechargeable batteries are to be simultaneously charged, charging can be performed efficiently when control is executed, for example, to interrupt the charging of a rechargeable battery whose charging current is smaller than its threshold value.

REFERENCE SIGNS LIST

1 Electrical device
11 First rechargeable battery
12 Second rechargeable battery
13 Charging circuit
14 First capacity computation circuit
15 Second capacity computation circuit
16 Power supply terminal
17 Load

The invention claimed is:

1. An electrical device having a plurality of parallel-connected built-in rechargeable batteries, the electrical device comprising:
   a power supply terminal that receives electrical power supplied from an outside of the electrical device; and
   a charging circuit that executes charge control so as to charge the plurality of rechargeable batteries using the electrical power supplied from the outside;
   wherein, during the execution of the charge control, the charging circuit interrupts the charging of a particular one of the rechargeable batteries in accordance with respective magnitudes of respective charging currents flowing to each of the plurality of rechargeable batteries,
   wherein, when interrupting the charging of a particular one of the rechargeable batteries is called for, the charging circuit changes a recharge threshold value to a value lower than a battery voltage present at the time point of the interruption, such that the interrupting the charging of the particular rechargeable battery is achieved, and wherein, if the charging current flowing to a particular rechargeable battery is smaller than a predetermined threshold value while the charging of any of the other rechargeable batteries is interrupted, the charging circuit resumes the charging of the rechargeable battery whose charging is interrupted.

2. The electrical device according to claim 1, wherein, when the charging current flowing to a particular one of the rechargeable batteries is smaller than a predetermined threshold value, the charging circuit interrupts the charging of the particular rechargeable battery receiving the charging current smaller than the predetermined threshold value.

3. The electrical device according to claim 2, wherein, if the charging current flowing to a particular rechargeable battery is smaller than the predetermined threshold value when a current flowing to any of the other rechargeable batteries reaches a maximum charging current while each of the rechargeable batteries is charged to increase an output voltage, the charging circuit interrupts the charging of the particular rechargeable battery.

* * * * *